March 11, 1969  R. H. ANGOLD  3,431,835

COOKING FOOD UNDER PRESSURE

Filed March 2, 1965  Sheet 1 of 4

Inventor
Raymond H. Angold
By Cushman, Darby & Cushman
Attorneys

March 11, 1969  R. H. ANGOLD  3,431,835
COOKING FOOD UNDER PRESSURE
Filed March 2, 1965  Sheet 3 of 4
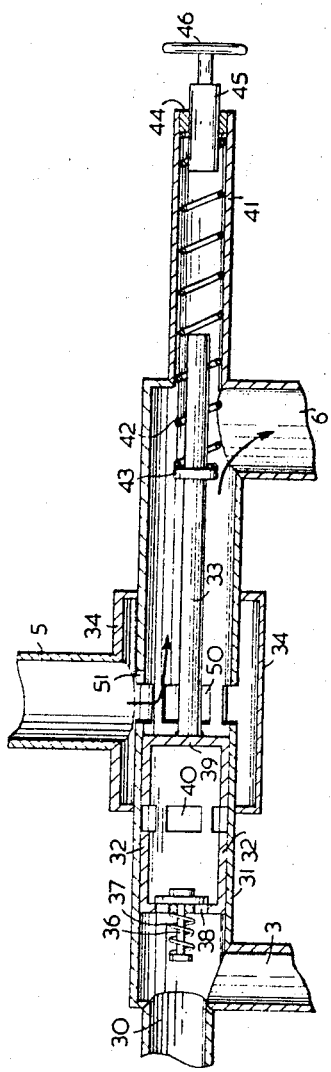
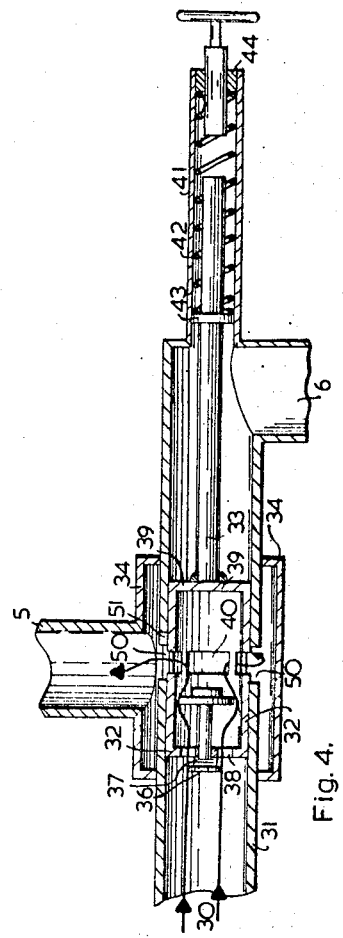
INVENTOR
RAYMOND H. ANGOLD

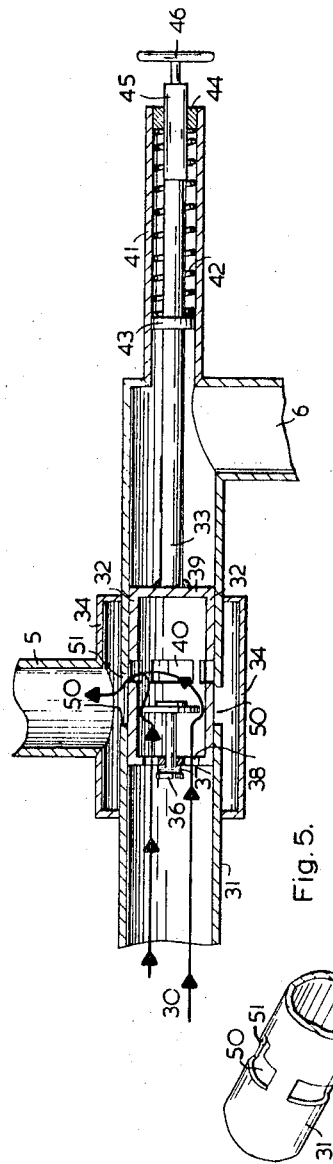

3,431,835
COOKING FOOD UNDER PRESSURE
Raymond H. Angold, 177 Casterton Ave.,
Kingston, Ontario, Canada
Filed Mar. 2, 1965, Ser. No. 436,440
Claims priority, application Canada, Oct. 9, 1964,
913,595
U.S. Cl. 99—408                                       9 Claims
Int. Cl. A47j 37/12

ABSTRACT OF THE DISCLOSURE

Apparatus for deep frying under pressure greater than atmospheric, wherein hot cooking liquid is pumped continuously through a cooking chamber for a perdetermined period of time. The chamber is designed so that no food is placed into or removed from the hot cooking liquid. Valve and drain means are provided, respectively, for controlling the pressure in the chamber during cooking and for effecting draining thereof whenever the pump ceases operation.

---

This invention relates broadly to the cooking of food. More particularly, the invention is directed to the cooking of food in a heated liquid and under a pressure greater than normal atmospheric pressure.

In recent years it has been found advantageous in the case of some foods to cook them in a heated liquid (e.g. hot fat) under pressure, rather than in open fryers. This method of cooking has found particularly successful application in the cooking of chicken and has resulted in the recent upsurge in popularity of fried chicken. The cooking of food in fat and in containers designed to keep the food under pressure while cooking can utilize the natural moisture contained in the food to produce the desired pressure. Initially, some moisture in the food being cooked is vaporized by the hot fat and the resulting steam creates a pressure in the closed container. In some instances where desired, however, additional water can be injected into the cooking chamber, or the pressure within the cooking chamber can be created by other means.

The cooking of food in fat under pressure has a number of advantages over the open fryer method for the cooking of certain foods. The greater than atmospheric pressure raises the boiling point of moisture in the food. The food itself can then reach a higher temperature than in the open fryer method, and this reduces the required cooking time and results in the food being cooked in less time. The pressure cooking of the food also results in retention of moisture in the food which would have been lost in open fat frying, and a reduction of fat absorption by the food, which not only reduces the amount of fat consumed by the cooking operation but produces a food that is more tender and palatable. In the case of foods which have been spiced or seasoned before being placed in the cooker, the increased pressure results in better impregnation and distribution of the spices or seasonings into the food.

From the above it is apparent that the cooking of certain foods in fat under pressure takes less time, and results in a food which possesses superior eating qualities.

A process of cooking in fat under presure which is in common use today utilizes two large open deep fat fryers which serve as reservoirs and a large number of smaller pressure cookers of a size not much larger than the pressure cookers used in individual homes. The hot fat is ladled into a pressure cooker from the deep fat fryer and then carried and set on an open burner where the temperature is raised higher since there will be a considerable temperature drop when the cold food is placed in the fat. The lid is quite often left off the pressure cooker until the food which has been placed in the fat has started to turn brown and the cooker is then sealed with the lid, and the cooking completed. When the desired cooking time has expired the lid is removed, the food is taken from the fat, and the pressure cooker is carried to the second open fryer and dumped. Between the second fryer and the first fryer (from which the fat was originally taken) there is placed a filter and the fat from the second fryer passes through this filter to the first fryer to remove any crumbs or particles. This prepares the fat for subsequent reuse.

The above presently used process of pressure cooking in fat possesses several disadvantages. The open fryers and the many burners and cookers require a large kitchen area, and inaddition, the heat produced by the burners usually requires a large and costly exhaust system. In some instances it has been found necessary to house the cooking equipment in a separate room. This method is also messy as well as dangerous. The pressure cookers of hot fat must be ladled full and then carried to a burner where the food is subsequently placed in the fat. Spilling and splashing of the fat can occur which makes the floors and equipment dirty and slippery, and the persons involved in the cooking operation can also be burned by contact with the hot fat. Another disadvantage is the fact that there is only a small volume of fat in each individual cooker. A high initial temperature is required due to the cooling which occurs when the food is first placed in the fat, and also to effect an initial browning of the food. This initial high temperature hastens deterioration of the fat. Also, at busy times, kitchen personnel sometimes forget to remove the pressure cooker at the correct time resulting in burning and wastage of the food.

It has also been proposed in the prior art to use a single combined deep fat fryer and pressure cooker. Examples of such apparatus are disclosed in U.S. Patents 2,778,736 and 2,914,063, Wagner, issued Jan. 22, 1957 and Nov. 24, 1959. In this type of cooker successive portions of food are cooked in the same fat without it being filtered and, since in many cases the food cooked in the deep fat is floured or breaded, and spiced, the fat deteriorates quite rapidly. The palatability of the food is impared and there is also the danger of persons being burned when putting food in or out of the cooker. This type of apparatus has not met with a large acceptance.

It is an object of this invention to retain the advantages present in the cooking of certain foods in a heated liquid under pressure while minimizing many of the disadvantages of, and objections to the apparatus and processes which are presently known.

In accordance with one aspect of this invention there is provided a process for the cooking of food in a pressurizable chamber which includes the step of continuously circulating a cooking liquid through the chamber for a desired time period. The liquid is maintained at a pressure greater than normal atmospheric and is heated to a temperature sufficient to effect the cooking of the food in the chamber.

Another aspect of the invention relates to apparatus for the cooking of food under pressure in which there is provided a housing defining a pressurizable cooking chamber together with means for continuously supplying the chamber with a cooking liquid maintained under pressure greater than normal atmospheric. The housing has a sealable opening permitting access to the cooking chamber and the chamber has an outlet which allows substantially continuous circulation of the cooking liquid during the cooking of food placed in the chamber.

In order that the invention may be more readily understood an embodiment of apparatus in accordance with the invention will now be described with reference to the accompanying drawings in which:

FIGURE 6 is a detailed drawing of a part of the valve shown in FIGURES 3 to 5.

Figure 1:
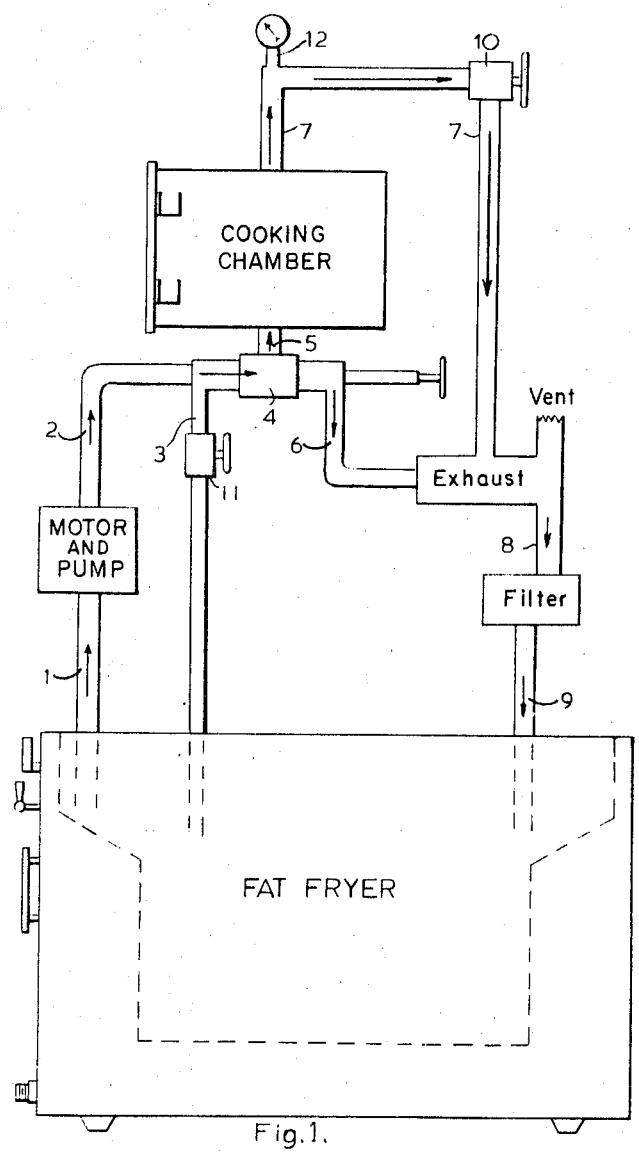
FIGURE 1 is a schematic drawing representing the interrelation of the various components of the cooking apparatus.

Referring to the schematic drawing of the apparatus in FIGURE 1, there is shown a deep fat fryer which serves as a source for the supply of the cooking fluid, in this case hot fat. This fryer may be a standard commercial fryer with the desired capacity and which has been equipped with the necessary heating elements and controls to heat and maintain the fat at a desired temperature. A pipe 1 leads from the fat fryer and is connected to a pump having a motor of suitable capacity. It has been found in practice that an electric motor is very suitable for this purpose since it is small and easily controlled, although other means of operating the pump may be utilized.

Placed in the line 2 leading away from the pump is a bypass conduit 3 and valve 11 leading back to the fat fryer. The line 2 from the pump also leads to a combination filling, control, and drain valve designated as 4. This valve will be described in detail hereinafter and has two outlets; pipe 5 leading to and acting as an inlet to a housing defining a pressurizable cooking chamber, and pipe 6 providing a drain conduit from the chamber. Leading away from the cooking chamber is outlet conduit 7 which is equipped with a pressure gauge 12 and pressure control valve 10 set to maintain the desired pressure within the cooking chamber.

The outlet conduit 7 from the cooking chamber and the drain pipe 6 both lead to an exhaust outlet equipped with an exhaust vent, and a fan, if desired. A specially constructed exhaust chamber may be used if desired, but is not required, and it is sufficient to enlarge the outlet pipes in the form of a T, as shown, connecting one branch to an exhaust vent. Conventional exhaust equipment with an exhaust vent will suffice so that any vapors carried through the drain and cooking chamber outlets are carried away without entering the room which houses the equipment.

A pipe 8 leads from the exhaust outlet to a fat filter. The fat returning from the cooking chamber passes through the filter which removes particles entrained in the fat as a result of the cooking operation. An enclosed and vented filter chamber may be provided which could simultaneously serve as the exhaust outlet. Conduit 9 returns the fat from the filter to the fat fryer which heats it back to the desired temperature ready for reuse. A separate conduit leading from the filter to the fryer may not be required if the filter is placed directly above and adjacent to the top of the fryer.

FIGURE 1 is entirely schematic and is not intended to show the relative positions, sizes, or configurations of the various components of the apparatus but only their interrelation. Certain nonessential parts such as the bypass, and exhaust and filter chambers could be eliminated, and the valve 4 could be replaced with separate valves and pipes to accomplish the inlet and draining of the cooking chamber. It would also be possible and within the scope of the invention to operate a plurality of cooking chambers from a single reservoir of cooking fluid.

Figure 2:
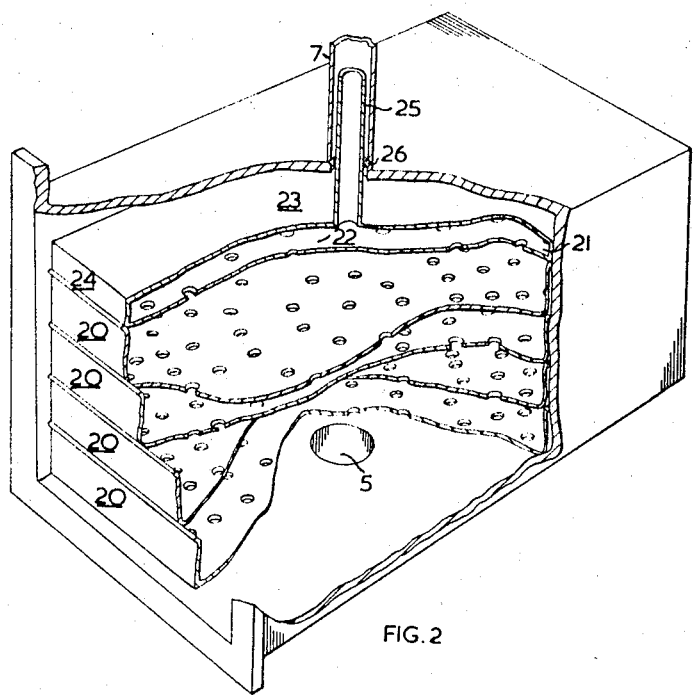
FIGURE 2 is an isometric view (partially cut away) of the cooking chamber of FIGURE 1, FIGURES 3 to 5, inclusive, are detailed cross sections of a valve forming part of the apparatus of FIGURE 1.

With reference to FIGURE 2, prior to operation the food to be cooked is placed in perforated cooking pans 20 which are then placed in the cooking chamber. The cooking chamber is provided with a movable outlet baffle 21 which is positioned over the upper-most food pan. The outlet baffle 21 consists of two plates 22 and 23 held in spaced apart relationship by side pieces 24. Plate 22, which is adjacent the top cooking pan, is perforated in the same manner as the cooking pans so that the fat can pass therethrough during the cooking operation. Top plate 23 is solid, preventing flow of fat through it. Leading from the centre of top plate 23 is pipe 25. Pipe 25 extends upwardly inside the outlet 7 from the cooking chamber and is sealed against the inside wall of outlet 7 by O-ring 26 held in outlet 7. The O-ring 26 permits the pipe 25 and baffle 21 to be moved up and down, but maintains a seal between the outside of pipe 25 and the inside of outlet 7. The pipe 25 is of such a length that the baffle 21 may be lowered and placed on top of only a single cooking pan while still maintaining a seal with O-ring 26. Outlet 7 has no bends but remains straight for a sufficient distance to permit baffle 21 and pipe 25 to be raised so as to accommodate the maximum number of cooking pans. The presence of adjustable baffle plate 21 allows the use of only the necessary amount of hot fat to completely cover the pans and food in the cooking chamber. Thus if it is desired to cook less than the maximum number of pans of food, the baffle 21 is lowered and placed on top of the uppermost pan. When the chamber is sealed and the hot fat is being pumped therethrough, the upper solid plate 23 of baffle 21 will deflect it to pipe 25 and outlet 7, and the seal between pipe 25 and outlet 7 provided by O-ring 26 traps a pocket of air above plate 23 which prevents the fat from filling the chamber completely and provides an expansion cushion zone which can absorb abrupt pressure increases due to vaporization of moisture and fluids within the food being cooked. Although it is not readily apparent from FIGURE 2 it is preferable to have the maximum perforations per unit area in the cooking pans closer to the outside, with fewer perforations near the centre. This requires the fat entering by a central inlet 5 and leaving by a central outlet 7 to circulate adequately to the remote corners of the cooking chamber. It is also desirable to have no perforations in the centre of the bottom pan opposite opening 5 or to place a baffle plate over opening 5 so that fat entering the cooking chamber through this opening will be deflected horizontally toward the outside of the chamber before circulating upwardly through the pans in the cooking chamber.

In operation, the timing of the cooking period is accomplished by placing an automatic timer in the circuit which operates the pump motor. The opening to the cooking chamber is sealed shut, the timer is set for the selected time period, and the pump started. The pump fills the cooking chamber with hot fat and maintains a controlled steady flow of hot fat through the cooking chamber. The top baffle in the cooking chamber allows the chamber to fill to the proper level covering the food but leaves a cushion of air above it. The continuous flow of heated fat through the chamber maintains the desired cooking temperature and since no more fat than is necessary to cover the food is present in the cooking chamber, the maximum amount of fat is kept up to temperature in the supply fryer. For the cooking of chicken (previously mentioned) the temperature of the fat in the fryer is maintained at about 325 to 350° F., although the actual temperature in the cooking chamber will probably be somewhat less and in the neighbourhood of 250 to 300° F.

A conventional pressure control valve is placed in the outlet conduit leading from the cooking chamber, as indicated by numeral 10 in FIGURE 1. The pressure control valve is preferably adjustable and a pressure guage 12 may be included in the outlet line 7 leading to the valve 10 so that the pressure within conduit 7 may be easily determined. The pressure control valve is set to open at the desired cooking pressure, usually about 10 to 20 pounds per square inch above atmospheric pressure, depending upon the food being cooked, and maintains the cooking chamber at that pressure. In the cooking of chicken a pressure of about double atmospheric or approximately 15 pounds per square inch above atmospheric has proved satisfactory. In the interest of safety, the cooking chamber could also be equipped with a pressure relief valve which would open if the pressure within the chamber exceeded a safe level.

The capacity of the pump should be in excess of the pressure desired in the cooking chamber. As a safety factor the bypass line 3 and valve 11 is left partially open at all times so that at no time would it be possible for the pump to have a closed outlet. Valve 11 controls the flow through bypass 3 and it may be desirable to place additional pressure gauges in the outlet from the pump to ensure that the pressure of the hot fat being supplied to the cooking chamber is in excess of the pressure being maintained in the chamber by the pressure control valve. This open bypass line 3 also relieves the pressure in the conduit from the pump to valve 4 when the pump is stopped.

Upon initial starting of the pump the cooking chamber fills and the pressure provided by the pump builds up in the chamber until it reaches the pressure at which the control valve opens. During the cooking operation the steam and the exhaust fat from the cooking chamber pass through conduit 7 to the exhaust outlet where the vapors and fat separate; the vapors being vented and the fat being piped to the filter where it returns to the fryer for reheating.

Upon completion of the timer cycle, the pump is automatically shut off. The relief of pressure against valve 4 opens the drain conduit (as described in detail later), and the cooking chamber empties through the drain valve to the exhaust outlet and filter; the fat then running back to the fryer. In order to speed the draining of the cooking chamber, a valve which would permit the entry of air to the top of the chamber and relieve any partial vacuum created by the draining of the fat could be included in outlet conduit 7 or in the top of the chamber. A vacuum breaker line leading from outlet conduit 7 to valve 4 and bypassing the cooking chamber which would allow flow of air to the top of the chamber when valve 4 was in the draining position could also be included.

When the fat has drained from the cooking chamber the door may be opened and the food removed. If the food is not removed immediately the cooking chamber acts as a warmer, keeping the food warm from the residual heat, but the draining of the fat and removal of pressure prevents overcooking. It is contemplated and preferable to equip the apparatus with a safety device which would prevent the door of the cooking chamber from being opened until the cooking chamber has drained. The use of a cooking chamber separate from a hot fat reservoir and supplied with hot fat under pressure has several advantages over the processes presently in use, many of which will be readily apparent from the above description. The food is always cooked in a supply of clean fat, which is kept constantly filtered before it is reheated. The automatic timer in the pump motor circuit accurately controls the cooking period and prevents overcooking. It is therefore not necessary for the kitchen staff to immediately remove the food. The food is cooked at a moderate and steady temperature, and, if desired, thermometers may be included in the apparatus to give the operator an easy check of the temperature of the fat. The present apparatus does not rely upon the natural moisture contained in the food product to produce the cooking pressure, but rather the pump maintains a pressure in the cooking chamber which can be closely controlled by adjustment of the pressure control valve. In addition, by control of the volume of fat passing through the cooking chamber the colour of the cooked food can be varied. Because there are no auxiliary burners and pots or pans, spilling and splashing of the fat is eliminated and the heat passed to the surrounding area by the apparatus is considerably reduced. No food is put directly into or taken out of hot fat. The design of the cooker with an exhaust outlet also reduces the amount of heat passed to the surroundings and keeps the area around the apparatus cleaner and fresher, and more pleasant to work in. The apparatus takes a very moderate amount of space in comparison to some previous methods and this together with the reduction in the amount of extraneous heat produced by the apparatus will permit the installation of the equipment into stores and kitchens without major alteration or addition. The cooking apparatus of this invention is very simple and requires a minimum of skill and instruction to operate. The fat used as the cooking medium is conserved by the apparatus since it is not heated to high initial temperatures and also because the fat is heated only after it has been filtered to remove the food particles which help cause its deterioration.

Referring now to FIGURES 3 to 6, there is shown the details of the construction of valve 4, which controls the filling, the flowthrough, and the draining of the cooking chamber. The valve inlet from the pump is indicated by the reference numeral 30. Located close to the inlet 30 is bypass line 3 leading via bypass valve 11 back to the fryer. The bypass can conveniently be made a part of valve 4 but this is not essential and the bypass could also be placed anywhere in the line leading from the pump to the valve.

The valve includes an outer cylindrical portion 31 and an inner piston-like portion 32 which can slide within the outer cylinder 31. The inner portion 32 has a rod 33 rigidly secured thereto at the end remote from inlet 30. Surrounding the outer cylindrical portion 31 is a further cylindrical housing 34 from which the inlet 5 to the cooking chamber (not shown) leads. At the end of the valve remote from inlet 30 there is the outlet 6 to the exhaust vent and filter chamber.

The inner piston-like portion 32 is formed as a hollow cylinder and has a spring-loaded check valve 36 which is biased by spring 37 to close the opening 38 in that end wall nearest the valve inlet 30. Opposite end wall 39 is closed and has rod 33 rigidly attached thereto. Between the end walls of inner portion 32 there are a number of rectangular openings 40 around the circumference.

The end of the outer cylinder portion 31 remote from the inlet end 30 includes a cylindrical extension 41 of smaller diameter into which extends the rod 33 of the piston portion 32. Enclosed partially within the extension 41 and surrounding the rod 33 is a coil spring 42 which at one end abuts against an annular flange 43 on rod 33, and at the other end contacts closed end 44 of the extension 41. Extending through the end wall 44 is stroke control stop 45 having a handle 46. The end of the stroke control stop 45 remote from handle 46 extending through wall 44 and into extension 41 is of smaller diameter than coil spring 42 and is encompassed by the spring. The turning of handle 46 moves the stroke control axially and varies the length of stop 45 which protrudes into the valve extension 41.

The outer cylindrical portion 31 also contains a series of rectangular openings 50 which are spaced around its circumference and are within cylindrical housing 34. These openings are preferably placed in alignment with the inlet 5 to the cooking chamber. In addition to the rectangular openings 50, as shown in FIGURE 6 there are additional smaller openings 51 in the cylinder wall which extend in an axial direction away from large openings 50. The cylindrical housing 34 encompasses and is rigidly connected and sealed to valve portion 31.

In FIGURE 3 the valve is shown in the pump "stopped" or "draining" position. With no pump pressure against the end wall of the inner piston portion 32 which is remote from the rod 33, the spring 42 compressed against flange 43 pushes the piston portion towards inlet 30. This opens the cooking chamber inlet 5 to the drain conduit 6 via housing 34, through openings 50 and 51, into and along inside the outer valve portion 31, and to the drain conduit 6 (as indicated by the arrow on FIGURE 3). Any fat contained in the cooking chamber drains out by gravity.

In FIGURE 4 the valve is shown in its cooking chamber filling position. When the pump is actuated the pressure against the end face of inner piston 32 adajacent the valve inlet 30 moves the piston portion 32 against the bias of spring 42. At the same time this pressure opens check valve 36 which is only lightly spring loaded by spring 37 so that it opens readily under slight pressure. The piston portion 32 is pushed by the pressure created by the pump until openings 40 are in alignment with openings 50 in the outer cylindrical valve portion 31. Rapid filling of the cooking chamber then follows, as indicated by the arrows on FIGURE 4.

In FIGURE 5 the valve is shown in the position it assumes after the cooking chamber has been filled and is at the desired pressure, and the actual cooking of the food is underway. When the pressure in the cooking chamber has built up close to that maintained by the pressure control valve, the resistance to flow into the cooking chamber becomes greater than the bias of spring 42. The piston portion 32 is then pushed further by the pump pressure against the resistance of coil spring 42 until the end of rod 33 contacts the inner end of stroke control 45. This stops further movement and in this position openings 40 are no longer in alignment with openings 50 but small openings 51 (FIGURE 6) still remain partially in alignment with openings 40, and restricted flow to the cooking chamber takes place. Regulation of this flow can be effected by turning stroke control 45, thus varying the axial protrusion of the stop into valve extension 41, and the position of piston portion 32 relative to openings 51. In the cooking of foods where temperature control is important, regulation of the flow of hot fat into the cooking chamber could be made temperature responsive by the use of a thermostatic control on the valve.

When the pump stops and the pressure created by it is relieved, check valve 36 closes openings 38 and the spring 42 pushes the inner piston portion 32 back to the position shown in FIGURE 3. The cooking chamber then drains as described previously.

Although the invention has been described with reference to particular apparatus in which heated fat is used, it will be obvious to those skilled in the art that the apparatus could be adapted to use other cooking fluids.

I claim:

1. Apparatus for the cooking of food under pressure comprising, a housing defining a pressurizable cooking chamber for said food, said housing having a sealable opening permitting access to said chamber, a pump for continuously supplying from a source of supply to said cooking chamber during the cooking operation a cooking liquid heated to a temperature sufficient to effect the cooking of said food, said housing having inlet and outlet means to and from said cooking chamber which permit substantially continuous circulation of said heated liquid through said chamber during the cooking of said food, said outlet means having a control valve adjustable to open at a desired cooking pressure and which maintains this pressure within said cooking chamber during the cooking operation, said pump supplying the heated liquid to said chamber at a pressure greater than the cooking pressure being maintained within said cooking chamber by said outlet control valve, timing means for controlling the period of operation of said pump, and means for draining said cooking chamber when said pump ceases operation.

2. Apparatus as defined in claim 1 wherein said liquid is cooking fat.

3. Apparatus for the cooking of chicken under pressure comprising, a housing definining a pressurizable cooking chamber for the chicken, said housing having a sealable opening permitting access to said chamber, a pump for continuously supplying from a source of supply to said cooking chamber during the cooking operation cooking fat at a temperature sufficient to effect the cooking of the chicken, said housing having inlet and outlet means to and from said cooking chamber which permit substantially continuous circulation of said hot fat through said chamber during the cooking of the chicken, said outlet means having a control valve adjustable to open at a desired cooking pressure and which maintains this pressure within said cooking chamber during the cooking operation, said pump supplying the hot fat to said chamber at a pressure greater than the cooking pressure being maintained within said cooking chamber by said outlet control valve, timing means for controlling the period of operation of said pump, and means for draining said cooking chamber when said pump ceases operation.

4. Apparatus for the cooking of food under pressure comprising, a housing defining a pressurizable cooking chamber for said food, said housing having a sealable opening permitting access to said chamber, a pump for continuously supplying from a source of supply to said cooking chamber during the cooking operation liquid heated to a temperature sufficient to effect the cooking of said food, said housing having inlet and outlet means to and from said cooking chamber which permit substantially continuous circulation of said heated liquid through said chamber during the cooking of said food, said outlet means having a control valve adjustable to open at a desired cooking pressure and which maintains this pressure within said cooking chamber during the cooking operation, said pump supplying the heated liquid to said chamber at a pressure greater than the cooking pressure being maintained within said cooking chamber by said outlet control valve, timing means for controlling the period of operation of said pump, and means for draining said cooking chamber when said pump ceases operation, said outlet means and said draining means returning the liquid from said chamber to said source, said outlet means and said draining means being provided with an exhaust vent permitting removal of vapors leaving said cooking chamber with said liquid, and being provided with a filter through which said cooking liquid passes before returning to said source.

5. Apparatus as defined in claim 4 wherein said liquid is cooking fat.

6. Apparatus for the cooking of chicken under pressure comprising, a housing defining a pressurizable cooking chamber for the chicken, said housing having a sealable opening permitting access to said chamber, a pump for continuously supplying from a source of supply to said cooking chamber during the cooking operation cooking fat at a temperature sufficient to effect the cooking of the chicken, said housing having inlet and outlet means to and from said cooking chamber which permit substantially continuous circulation of the cooking fat through said chamber during the cooking of the chicken, said outlet means having a control valve adjustable to open at the desired cooking pressure and which maintains this pressure within said cooking chamber during the cooking operation, said pump supplying the hot fat to said chamber at a pressure greater than the cooking pressure being maintained within said cooking chamber by said outlet control valve, timing means for controlling the period of operation of said pump, and means for draining said cooking chamber when said pump ceases operation, said outlet means and said draining means returning the cooking fat from said chamber to said source, said outlet means and said draining means being provided with an exhaust vent permitting removal of vapors leaving said cooking chamber with said cooking fat, and being provided with a filter through which said cooking fat passes before returning to said source.

7. Apparatus for the cooking of food under pressure comprising, a housing defining a pressurizable cooking chamber for said food, said housing having a sealable opening permitting access to said chamber, a pump for continuously supplying from a source of supply to said cooking chamber during the cooking operation a cooking liquid at a temperature sufficient to effect the cooking of said food, timing means for controlling the period of operation of said pump, said housing having inlet and outlet means to and from said cooking chamber which permit substantially continuous circulation of said heated liquid through said chamber during the cooking of said food, said housing having means permitting draining said cooking chamber when said pump ceases operation, an adjustable valve responsive to the pressure created by said pump for filling said cooking chamber, controlling the circulation of cooking liquid through said chamber, and for draining said chamber, said outlet means having a control valve adjustable to open at a desired cooking pressure and which maintains this pressure within said cooking chamber during the cooking operation, said pump supplying the heated liquid to said chamber at a pressure greater than the cooking pressure being maintained within said cooking chamber by said outlet control valve, said outlet means and said draining means returning said cooking liquid from said chamber to said source, said outlet means and said draining means being provided with an exhaust vent permitting removal of vapors leaving said cooking chamber with said cooking liquid, and being provided with a filter through which said liquid passes before returning to said source.

8. Apparatus as defined in claim 7 wherein said liquid is cooking fat.

9. Apparatus for the cooking of chicken under pressure comprising, a housing defining a pressurizable cooking chamber for the chicken, said housing having a sealable opening permitting access to said chamber, a pump for continuously supplying from a source of supply to said cooking chamber during the cooking operation cooking fat at a temperature sufficient to effect the cooking of the chicken, timing means for controlling the period of operation of said pump, said housing having inlet and outlet means to and from said cooking chamber which permit substantially continuous circulation of said cooking fat through said chamber during the cooking of the chicken, said housing having means permitting draining of said cooking chamber when said pump ceases operation, an adjustable valve responsive to the pressure created by said pump for filling said chamber, controlling the circulation of cooking fat through said chamber, and for draining said chamber, said outlet means having a control valve adjustable to open at a desired cooking pressure within said cooking chamber during the cooking operation, said pump supplying the cooking fat to said chamber at a pressure greater than the cooking pressure being maintained within said cooking chamber by said outlet control valve, said outlet means and said draining means returning the cooking fat from said chamber to said source, said outlet means and said draining means being provided with an exhaust vent permitting removal of vapors leaving said cooking chamber with said fat, and being provided with a filter through which said fat passes before returning to said source.

References Cited
UNITED STATES PATENTS

| | | | |
|---|---|---|---|
| 2,767,095 | 10/1956 | Smith | 99—403 |
| 3,107,601 | 10/1963 | Longmire | 99—408 X |
| 3,159,095 | 12/1964 | Wagner | 99—408 |
| 3,210,193 | 10/1965 | Martin | 99—403 |

ROBERT W. JENKINS, *Primary Examiner.*